(12) United States Patent
Villalva Sanchez et al.

(10) Patent No.: US 11,225,215 B2
(45) Date of Patent: *Jan. 18, 2022

(54) VEHICLE FOOT PEDAL STOWAGE AND CONCEALMENT SYSTEM

(71) Applicant: Ford Global Technologies, LLC, Dearborn, MI (US)

(72) Inventors: Pablo Isaac Villalva Sanchez, Mexico City (MX); Guillermo Cesar Cervantes Guarneros, Atizapan de Zaragoza (MX); Rosa Elia Vazquez Valdez, Mexico City (MX); Peter Nicholas Kalergis, Canton, MI (US); Luis Alfredo Servin Garduno, Coyoacan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

This patent is subject to a terminal disclaimer.

(21) Appl. No.: 16/702,961

(22) Filed: Dec. 4, 2019

(65) Prior Publication Data

US 2021/0170988 A1  Jun. 10, 2021

(51) Int. Cl.
*B60T 7/06* (2006.01)
*B60R 21/09* (2006.01)

(52) U.S. Cl.
CPC ............. *B60R 21/09* (2013.01); *B60T 7/06* (2013.01)

(58) Field of Classification Search
CPC ..... B60R 21/09; B60R 25/003; B60R 25/005; G05G 1/30; G05G 1/32; G05G 1/36;
(Continued)

(56) References Cited

U.S. PATENT DOCUMENTS 1,263,731 A * 4/1918 Baker ................... B60R 25/005
70/200
4,632,209 A * 12/1986 Russell ................. B60R 25/006
180/287
(Continued)

FOREIGN PATENT DOCUMENTS

DE  102018206274 B3  6/2019
EP       1243996 A1 * 9/2002 ............. G05G 5/005
(Continued)

OTHER PUBLICATIONS

Machine Translation of KR 10-2017-0000013, obtained May 19, 2021.*
(Continued)

*Primary Examiner* — Richard W Ridley
*Assistant Examiner* — Brian J McGovern
(74) *Attorney, Agent, or Firm* — David Coppiellie; Price Heneveld LLP

(57) ABSTRACT

A footwell assembly for a vehicle is disclosed herein. The footwell assembly includes a receiving member that defines a recess configured to receive a stowed foot pedal. A cover feature includes a connecting member that is removably coupled to the receiving member and a cover member that is coupled to the connecting member. The cover member is operable to move relative to the connecting member from a first position to a second concealment position to cover the stowed foot pedal.

20 Claims, 8 Drawing Sheets

(58) Field of Classification Search
CPC .. G05G 1/40; G05G 1/405; B60T 7/02; B60T 7/04; B60T 7/06; B60K 2023/005; B60K 2023/025; B60K 26/02; B60K 2026/024; B60K 2026/026
See application file for complete search history.

(56) References Cited

U.S. PATENT DOCUMENTS

| | | | | |
|---|---|---|---|---|
| 4,912,952 | A * | 4/1990 | Magrobi | B60R 11/00 |
| | | | | 180/287 |
| 9,010,472 | B2 | 4/2015 | Meszaros et al. | |
| 9,073,574 | B2 | 7/2015 | Cuddihy et al. | |
| 9,963,035 | B2 | 5/2018 | El Aile et al. | |
| 10,889,226 | B1 * | 1/2021 | Dean | B60N 3/063 |
| 10,913,419 | B2 * | 2/2021 | Mullen | B60N 3/044 |
| 2003/0084744 | A1 * | 5/2003 | Parenteau | G05G 1/405 |
| | | | | 74/512 |
| 2004/0262989 | A1 * | 12/2004 | Atthaprasith | B60T 17/16 |
| | | | | 303/89 |
| 2014/0210227 | A1 | 7/2014 | Meszaros et al. | |
| 2020/0317152 | A1 * | 10/2020 | Ghaffari | G05D 1/0061 |

FOREIGN PATENT DOCUMENTS

| | | | | |
|---|---|---|---|---|
| EP | 1488963 | A1 * | 12/2004 | B60R 21/09 |
| KR | 970039985 | A | 7/1997 | |
| KR | 20170000013 | A | 1/2017 | |
| KR | 20170137427 | A | 12/2017 | |
| WO | WO-2019007840 | A1 * | 1/2019 | B60R 21/09 |

OTHER PUBLICATIONS

Machine Translation of WO 2019/007840, obtained May 19, 2021.*
Machine Translation of EP 1,243,996, obtained May 19, 2021.*
"Modularity," Wikipedia Page, dated by Wayback Machine to Oct. 13, 2018, url:<https://web.archive.org/web/20181013034719/https://en.wikipedia.org/wiki/Modularity>.*

* cited by examiner

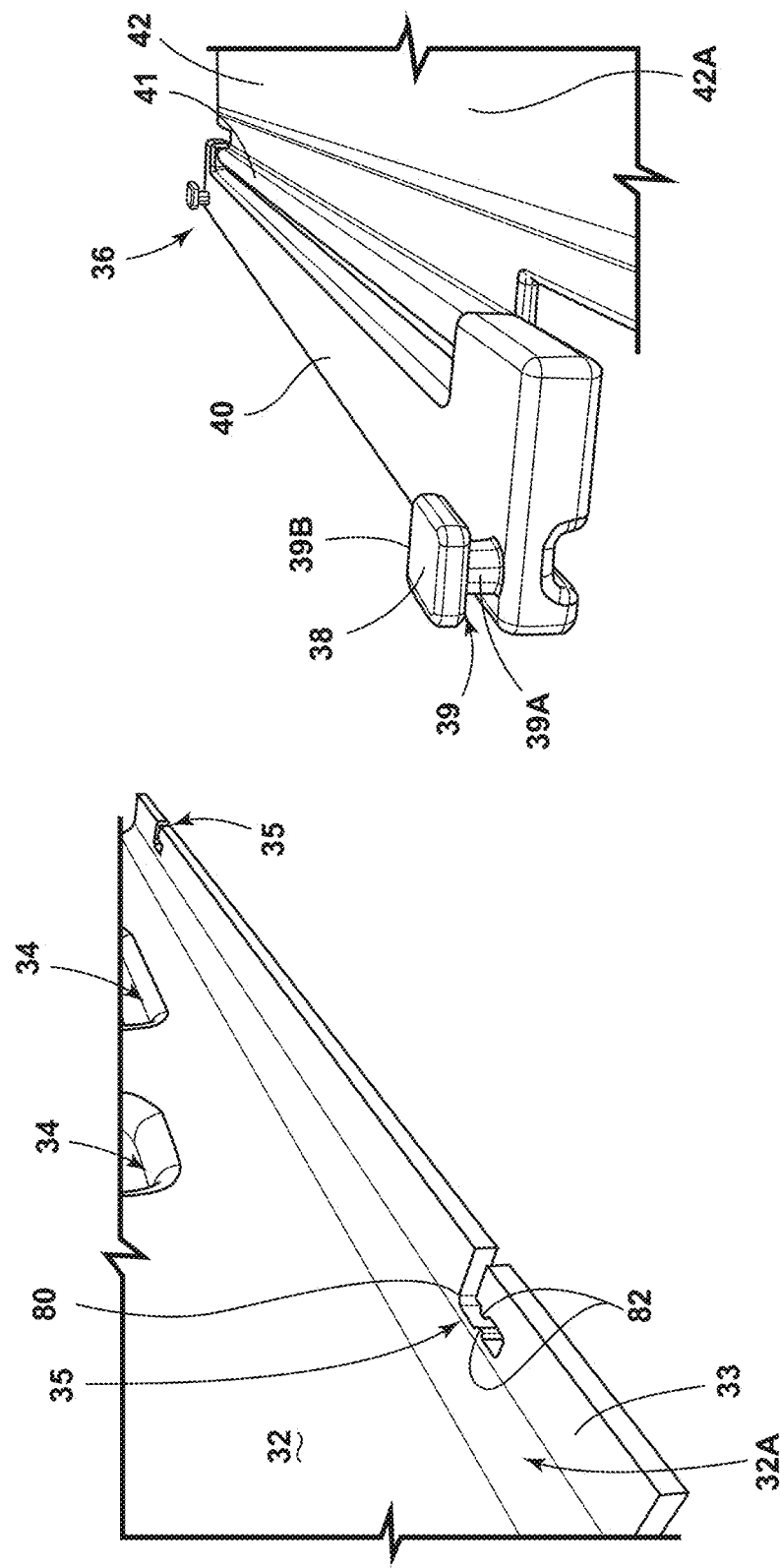

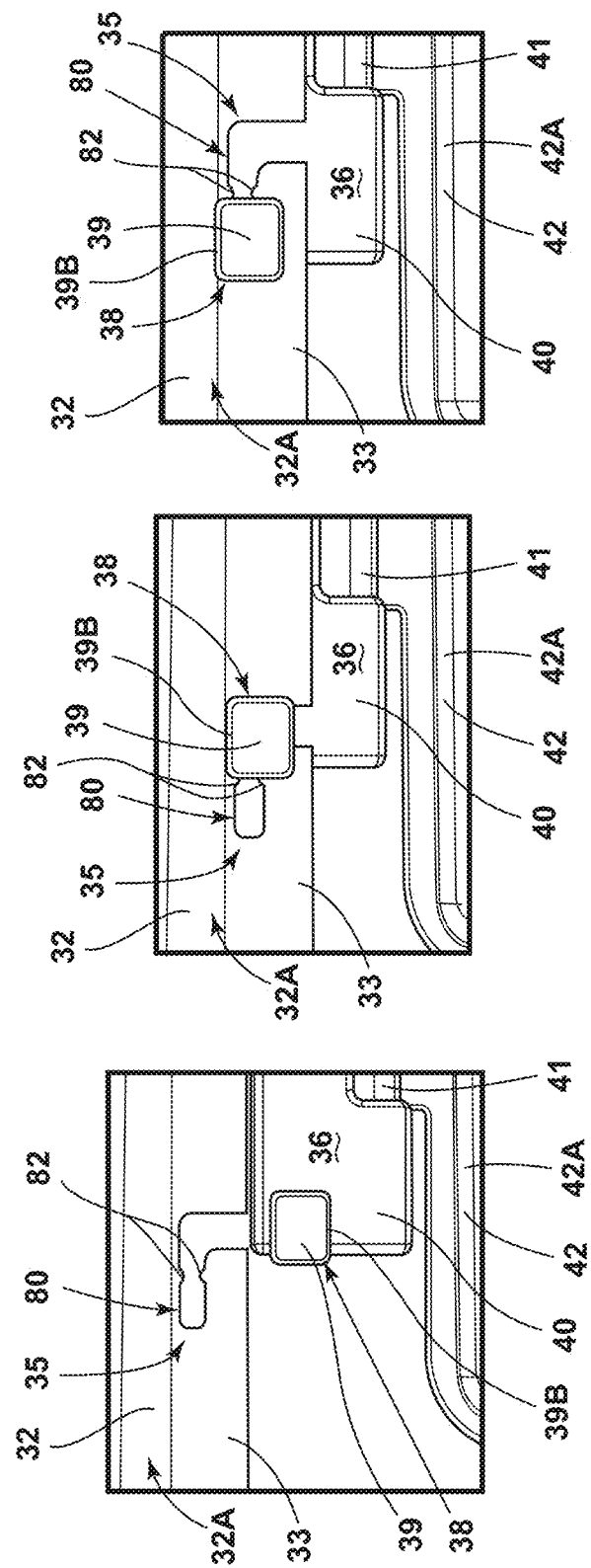

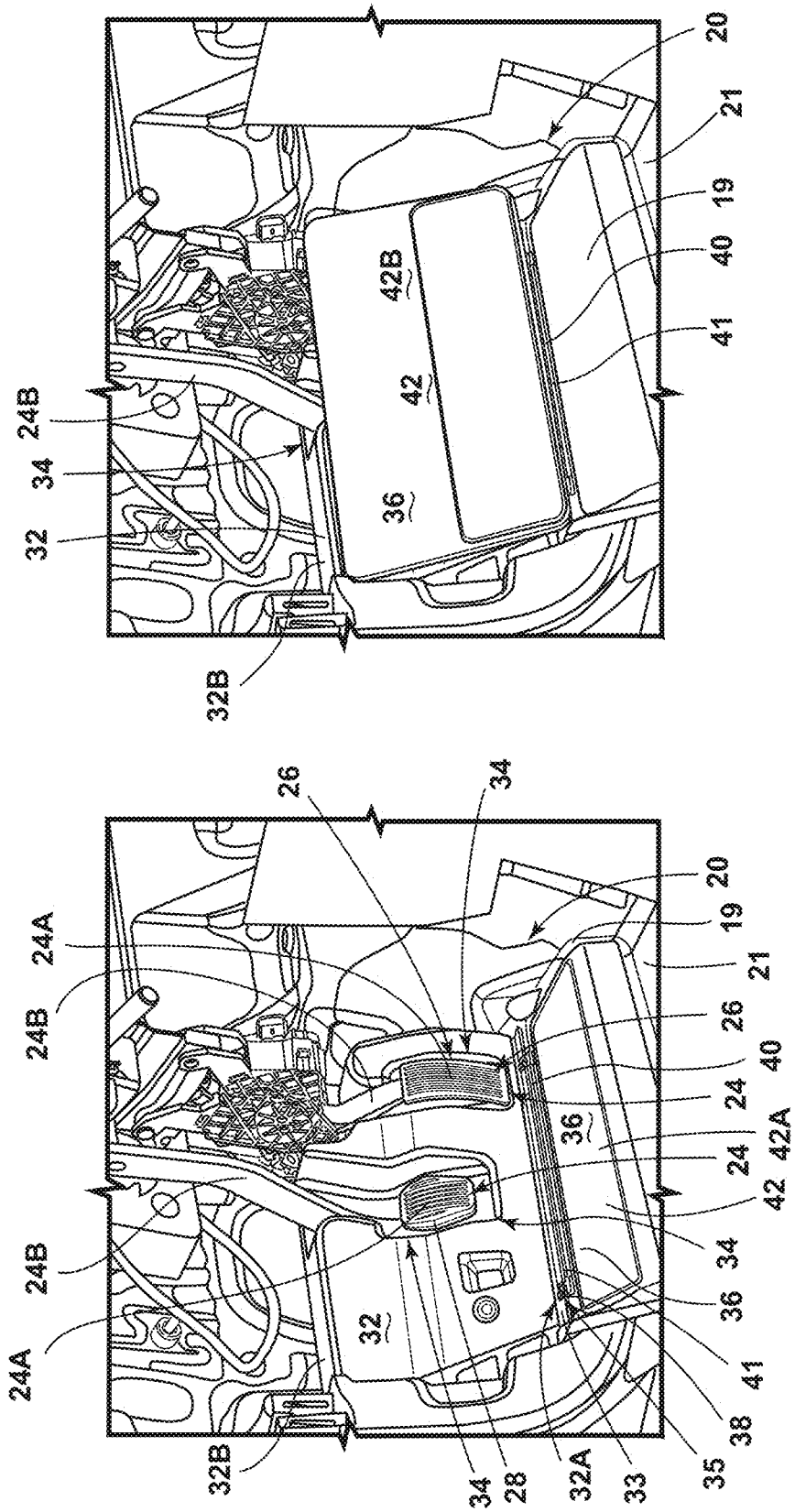

VEHICLE FOOT PEDAL STOWAGE AND CONCEALMENT SYSTEM

FIELD OF THE DISCLOSURE

The present disclosure generally relates to a footwell assembly for a vehicle. In particular, the present disclosure relates to a footwell assembly for concealing stowable foot pedals.

BACKGROUND OF THE DISCLOSURE

Vehicles often includes foot pedals. Autonomous vehicles may only need foot pedals in certain circumstances. Accordingly, the ability to stow foot pedals within the footwell of an autonomous vehicle may be convenient, as deactivated foot pedals may take up space unnecessarily. Further, covering stowed foot pedals with a cover feature may be desirable, as doing so may be aesthetically pleasing and may reduce confusion.

SUMMARY OF THE DISCLOSURE

According to a first aspect of the present disclosure, a footwell assembly for a vehicle includes a receiving member that defines a recess configured to receive a stowed foot pedal within the footwell of the vehicle. A cover feature is disposed in the footwell of the vehicle and includes a connecting member that is removably coupled to the receiving member and a cover member coupled to the connecting member. The cover member is operable to move relative to the connecting member from a first position to a second concealment position to cover the stowed foot pedal.

Embodiments of the first aspect of the disclosure may include any one or combination of the following features:
- the receiving member extends generally vehicle-upward from a lower portion proximate to a floor of the footwell to an upper portion, and the connecting member is removably coupled to the receiving member proximate to the lower portion;
- the receiving member comprises an attachment feature disposed proximate to the lower portion of the receiving member and configured to be engaged with a portion of the cover feature;
- the connecting member of the cover feature comprises an attachment feature configured to be engaged with the attachment feature of the receiving member;
- the cover feature is operable between an engaged condition, wherein the attachment feature of the connecting member is engaged with the attachment feature of the receiving member, and a disengaged condition, wherein the attachment feature of the connecting member is disengaged from the attachment feature of the receiving member;
- the attachment feature of the receiving member comprises a slot feature defined by the lower portion of the receiving member;
- the attachment feature of the connecting member comprises a protrusion that extends outward from the connecting member, such that the protrusion extends generally vehicle-upward from the connecting member and through the slot feature defined by the receiving member when the cover feature is in the engaged condition;
- the cover member of the cover feature is configured to move from the first position to the second concealment position by pivoting relative to the connecting member;
- the cover member comprises a first surface and a second surface disposed generally vehicle-downward of the first surface when the cover member is in the first position;
- the first surface is configured to contact the receiving member when the cover member is in the second concealment position;
- the second surface is configured to contact a floor of the footwell when the cover member is in the first position;
- the pivot axis extends generally vehicle-laterally; and
- the pivot axis is disposed vehicle-downward of the lower portion of the receiving member.

According to a second aspect of the present disclosure, a footwell assembly for a vehicle includes a foot pedal that is disposed in the footwell and is operable between a use position and a stowed position. A receiving member is positioned within the footwell and defines a recess. The foot pedal is configured to nest within the recess while in the stowed position. A cover feature is operable between an engaged condition, wherein the cover feature is engaged with the receiving member, and a disengaged condition, wherein the cover feature is disengaged from the receiving member. The cover feature, while in the engaged condition, is operable between a first position and a second concealment position, wherein the cover feature is configured to cover the foot pedal when the foot pedal is in the stowed position.

Embodiments of the second aspect of the disclosure may include any one or a combination of the following features:
- movement of the cover feature from the first position to the second concealment position includes pivotal movement of at least a portion of the cover feature in a generally vehicle-forward direction about a pivot axis that extends in a generally vehicle-lateral direction;
- the pivot axis is generally vehicle-rearward of the receiving member when the cover feature is in the engaged condition; and
- the pivot axis is generally vehicle-downward of the receiving member when the cover feature is in the engaged condition.

According to a third aspect of the present disclosure, a footwell assembly for a vehicle includes a foot pedal. The foot pedal is disposed in the footwell of the vehicle and is operable between a use position and a stowed position. A receiving member is positioned within the footwall and includes a lower portion that is proximate to a floor of the footwell. The receiving member defines a recess that is configured to receive the foot pedal when the foot pedal is in the stowed position. The receiving member includes an attachment feature that is disposed proximate to the lower portion of the receiving member. A cover feature is disposed in the footwell of the vehicle and includes a connecting member. The connecting member includes an attachment feature that is configured to be engaged with the attachment feature of the receiving member. The connecting member is operable between an engaged condition, wherein the attachment feature of the connecting member is engaged with the attachment feature of the receiving member, and a disengaged condition, wherein the attachment feature of the connecting member is disengaged from the attachment feature of the receiving member. The cover feature also includes a cover member that is pivotably coupled to the connecting member. When the connecting member is in the engaged condition, the cover member is operable to pivot relative to the connecting member between a first position and a second concealment position, wherein the cover member is configured to generally cover the foot pedal when the foot pedal is in the stowed position.

Embodiments of the third aspect of the disclosure may include any one or a combination of the following features:

the cover member comprises a first surface and a second surface disposed generally vehicle-downward of the first surface when the cover member is in the first position; and the first surface is configured to contact the receiving member when the cover member is in the second concealment position and the second surface is configured to contact the floor of the footwell when the cover member is in the first position.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5 is a perspective view of a portion of the receiving member, illustrating the attachment feature as a slot feature defined by a lip of the lower portion of the receiving member, according to one embodiment;

FIG. 6 is a perspective view of a portion of the cover feature, illustrating the attachment feature of the cover feature as a protrusion extending outward from the connecting member of the cover feature, according to one embodiment;

FIG. 7A is a top-down view of a portion of the receiving member and the cover feature, illustrating the attachment features of the cover feature and the receiving member while the cover feature is in a disengaged condition relative to the receiving member, according to one embodiment;

FIG. 7B is a top-down view of a portion of the receiving member and the cover feature, illustrating the attachment features of the cover feature and the receiving member while the cover feature is moving from the disengaged condition to an engaged condition, according to one embodiment;

FIG. 7C is a top-down view of a portion of the receiving member and the cover feature, illustrating the attachment features of the cover feature and the receiving member while the cover feature is in the engaged condition relative to the receiving member, according to one embodiment;

FIG. 8A is a perspective view of the footwell, illustrating the foot pedals in the stowed position, the cover feature in the engaged condition, and the cover feature in the first position, according to one embodiment;

FIG. 8B is a perspective view of the footwell, illustrating the foot pedals in the stowed position, the cover feature in the engaged condition, and the cover feature in a second concealment position, according to one embodiment.

DETAILED DESCRIPTION OF THE PREFERRED EMBODIMENTS

Figure 1:
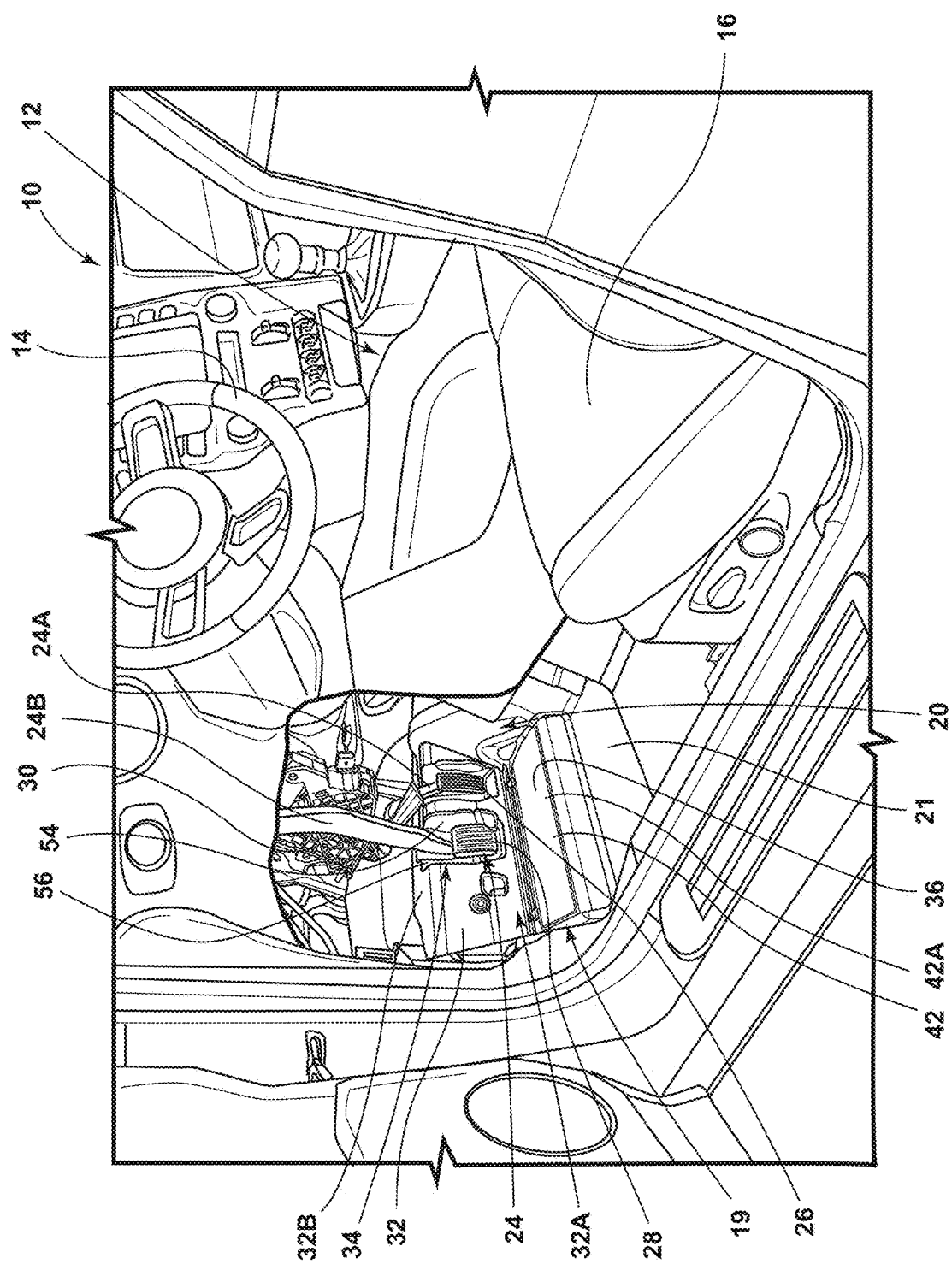
FIG. 1 is a perspective view of a vehicle footwell, illustrating foot pedals in a use position, according to one embodiment.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-9, a footwell assembly for a vehicle 10 is disclosed. The footwell 20 of the footwell assembly may include a foot pedal 24 that may be operable between a use position and a stowed position. A receiving member 32 may extend generally vehicle-upward from a lower portion 32A, that is proximate to a floor 21 of the footwell 20, to an upper portion 32B. The receiving member 32 may define a recess 34 that may be configured to receive the foot pedal 24, when the foot pedal 24 is in the stowed position. The receiving member 32 may include an attachment feature 35 that may be disposed proximate to the lower portion 32A of the receiving member 32. A cover feature 36 may include a connecting member 40. The connecting member 40 may have an attachment feature 38 configured to be engaged with the attachment feature 35 of the receiving member 32. The connecting member 40 may be operable between an engaged condition, wherein the attachment feature 38 of the connecting member 40 is engaged with the attachment feature 35 of the receiving member 32, and a disengaged condition, wherein the attachment feature 38 of the connecting member 40 is disengaged from the attachment feature 35 of the receiving member 32. A cover member 42 may be pivotably coupled to the connecting member 40. When the connecting member 40 is in the engaged condition, the cover member 42 may be operable to pivot relative to the connecting member 40 between a first position and a second concealment position, wherein the cover member 42 may be configured to generally cover the foot pedal 24, when the foot pedal 24 is in the stowed position.

Referring now to FIG. 1, the vehicle 10 may be a passenger motor vehicle that includes a vehicle interior 12 that defines a passenger compartment. The vehicle interior 12 may include a steering wheel 14. The vehicle interior 12 may further include a seating assembly 16. The seating assembly 16 may correspond to the position of the steering wheel 14 within the vehicle 10, such that the seating assembly 16 would be recognized as a driver's seat. The vehicle interior 12 may further include the footwell 20. The footwell 20 may be defined by a portion of the vehicle interior 12. In various embodiments, the footwell 20 may be the area in front of the seating assembly 16 that corresponds to the steering wheel 14 in which a seated vehicle occupant would place his or her feet. The footwell 20 may be bounded by various vehicle interior 12 components (e.g., the floor 21, the dashboard, the dead pedal 50, etc.). In some embodiments, the seating assembly 16 that corresponds with the steering wheel 14 may delineate the vehicle-rearward boundary of the footwell 20. In various embodiments, the footwell 20 may include the floor 21. It should be appreciated that the floor 21 may slope and/or have portions with differing heights within the footwell 20. For example, as depicted in FIG. 1, in some embodiments, the floor 21 may include a shelf 19 that is higher than other portions of the floor 21 of the footwell 20 and generally located in the vehicle-forward portion of the footwell 20.

In further reference to FIG. 1, at least one foot pedal 24 may be positioned within the footwell 20. In various embodiments, a plurality of foot pedals 24 may be positioned within the footwell 20. For example, in various embodiments, the footwell 20 may include an accelerator pedal 26, a brake pedal 28, and/or various other types of vehicle pedals (e.g., a clutch pedal, a parking brake pedal, etc.). In various embodiments, the at least one foot pedal 24 may be configured to be depressed by the foot of the vehicle occupant to perform a vehicle function, such as an acceleration input or braking input, as is customary in vehicles. In some embodiments, the at least one foot pedal 24 may be a suspended pedal, as shown in FIG. 1. It is contemplated that the at least one foot pedal 24 may be at least one of a variety of foot pedal styles (e.g., an organ-type, bottom hinged, etc.), in some embodiments. It is further contemplated that the footwell 20 may include multiple foot pedals 24 having similar or different pedal styles relative to one another.

As shown in FIG. 1, the at least one foot pedal 24 may include a pad 24A configured to be engaged by the foot of the vehicle occupant depressing the at least one foot pedal 24. In various embodiments, the accelerator pedal 26 and/or the brake pedal 28 may include the pad 24A. As further depicted in FIG. 1, the at least one foot pedal 24 may include a lever feature 24B. The lever feature 24B may be coupled to the pad 24A and may be configured to move in response to the at least one foot pedal 24 being depressed. In various embodiments, the lever feature 24B may be configured to pivot as the at least one foot pedal 24 is depressed by the vehicle occupant. As shown in FIG. 1, the lever feature 24B may be configured to extend generally vehicle-upward from the pad 24A. In some embodiments, however, the lever feature 24B may extend in various vehicle-directions relative to the pad 24A. For example, in some embodiments in which the at least one foot pedal 24 is a bottom-hinged-style pedal, the lever feature 24B may extend vehicle-downward from the pad 24A. In various embodiments, the lever feature 24B may be coupled to a surface of the pad 24A opposite of the surface of the pad 24A that is configured to be engaged by the foot of the vehicle occupant.

Referring now to FIGS. 2A-3B, the at least one foot pedal 24 may be operable between a use position and a stowed position. In various embodiments, the location of the at least one foot pedal 24, while in the stowed position, may be vehicle-forward of the location of the at least one foot pedal 24 while in the use position. It is contemplated that in some embodiments, the location of the at least one foot pedal 24 while in the stowed position may be various vehicle-directions relative to the location of the at least one foot pedal 24 while in the use position (e.g., vehicle-upward, vehicle-downward, vehicle-rearward, laterally displaced, etc.). The at least one foot pedal 24 may be depressed by the vehicle occupant in the use position, as is customary in wheeled motor vehicles.

Figure 3B:
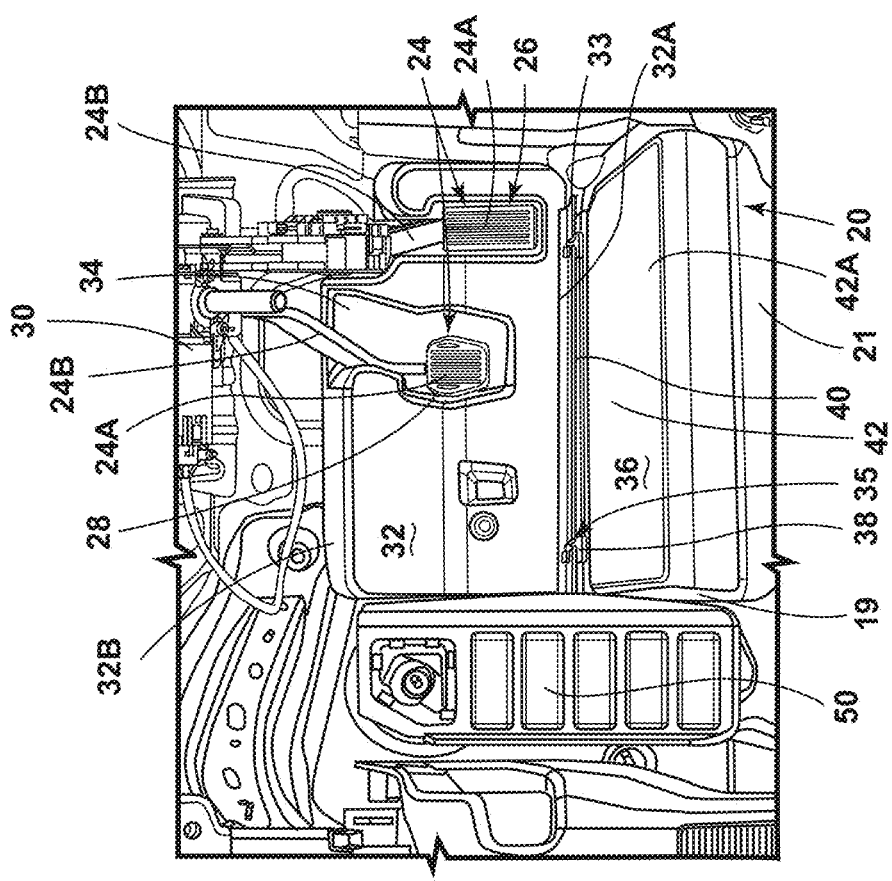
FIG. 3B is a frontal view of the footwell, illustrating the foot pedals in the stowed position and the cover feature in the first position, according to one embodiment.
Figure 3A:
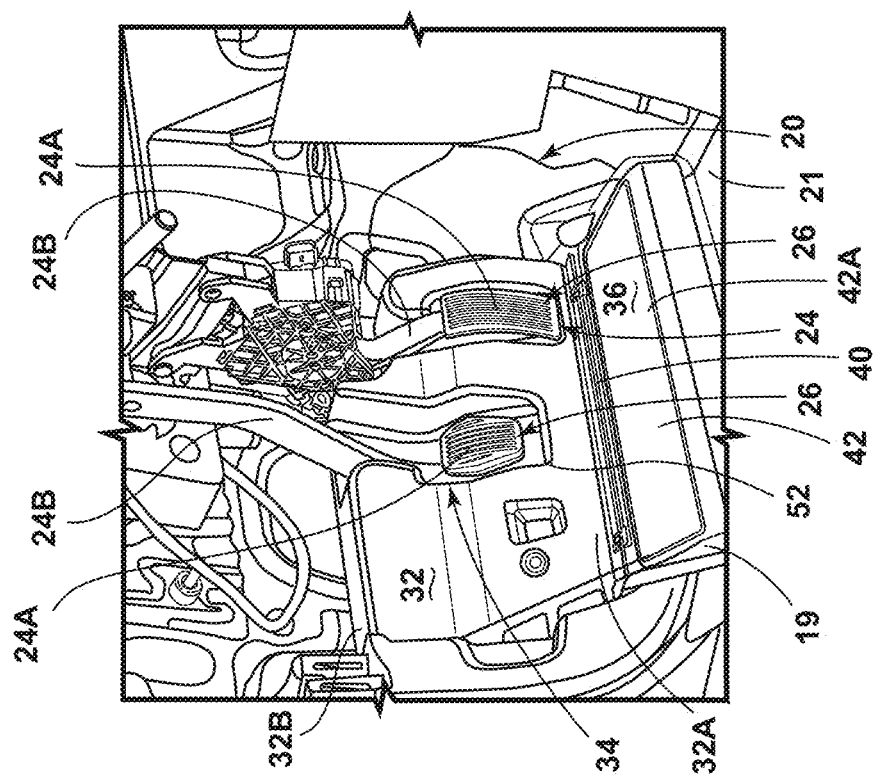
FIG. 3A is a perspective view of the footwell, illustrating the foot pedals in a stowed position and the cover feature in the first position, according to one embodiment.

As shown in FIG. 3B, in various embodiments, an actuator 30 may be operably coupled to the at least one foot pedal 24 and may be configured to actuate the at least one foot pedal 24 between the use and stowed positions. In some embodiments, the actuator 30 may be coupled to the lever feature 24B. It is contemplated that the actuator 30 may be a motor that is configured to move the at least one foot pedal 24, in various embodiments. It is further contemplated that the motor may be at least one of a variety of different motor types (e.g., AC brushless, DC brushed, DC brushless, direct drive, linear, servo, stepper, etc.). In various embodiments, the actuator 30 may be coupled to a controller 60 configured to control operation of the actuator 30.

In some embodiments, the at least one foot pedal 24 may be operable between an activated mode and a deactivated mode. The at least one foot pedal 24 may be configured to control action of the vehicle 10 while in the activated mode. For example, in some embodiments, the accelerator pedal 26 may be configured to prompt acceleration of the vehicle 10 upon being depressed by the vehicle occupant, and the brake pedal 28 may be configured to prompt application of the brakes of the vehicle 10 upon engagement by the vehicle occupant, while the acceleration pedal 26 and the brake pedal 28 are in the activated mode.

In some embodiments, the at least one foot pedal 24 may be configured to not control action of the vehicle 10 while in the deactivated mode. In other words, while in the deactivated mode, the at least one foot pedal 24 may be depressible by the vehicle occupant while the vehicle 10 is in operation (i.e., in gear and/or moving) and yet not influence acceleration, braking, and/or other actions of the vehicle 10. For instance, in an exemplary embodiment, the at least one foot pedal 24 may be in the deactivated mode while the vehicle 10 is driving autonomously (in autonomous mode), and engagement of the at least one foot pedal 24 may not influence the actions of the moving vehicle 10.

In some embodiments, the mode of the at least one foot pedal 24 (activated versus deactivated) may correspond to the position of the at least one foot pedal 24 (use position versus stowed position). For example, the at least one foot pedal 24 being in the activated mode may correspond to the at least one foot pedal 24 being in the use position. Further, in some embodiments, the at least one foot pedal 24 being in the deactivated mode may correspond to the at least one foot pedal 24 being in the stowed position. In some embodiments, the at least one foot pedal 24 may enter the deactivated mode in response to being positioned in the stowed position. In some embodiments, the at least one foot pedal 24 may be positioned in the stowed position in response to entering the deactivated mode. In various embodiments, movement of the at least one foot pedal 24 from the use position to the stowed position may prompt the at least one foot pedal 24 to enter the deactivated mode. Further, it is contemplated that, in some embodiments, the at least one foot pedal 24 may be configured not to remain in or enter the activated mode while in the stowed position. It is further contemplated that the controller 60 may control what mode the at least one foot pedal 24 is in based on one or more of a variety of factors.

Referring now to FIGS. 1-4, the footwell 20 may include the receiving member 32. In various embodiments, the receiving member 32 may be positioned proximate to the vehicle-forward end of the footwell 20. In some embodiments, the receiving member 32 may be positioned vehicle-forward of the at least one foot pedal 24. For example, in some embodiments, the receiving member 32 may be positioned vehicle-forward of the accelerator pedal 26 when the accelerator pedal 26 is in the use positon as well as when the accelerator pedal 26 is in the stowed position. It is contemplated that in some embodiments, the receiving member 32 may be positioned in various vehicle-directions within the footwell 20 relative to the at least one foot pedal 24.

Figure 4:
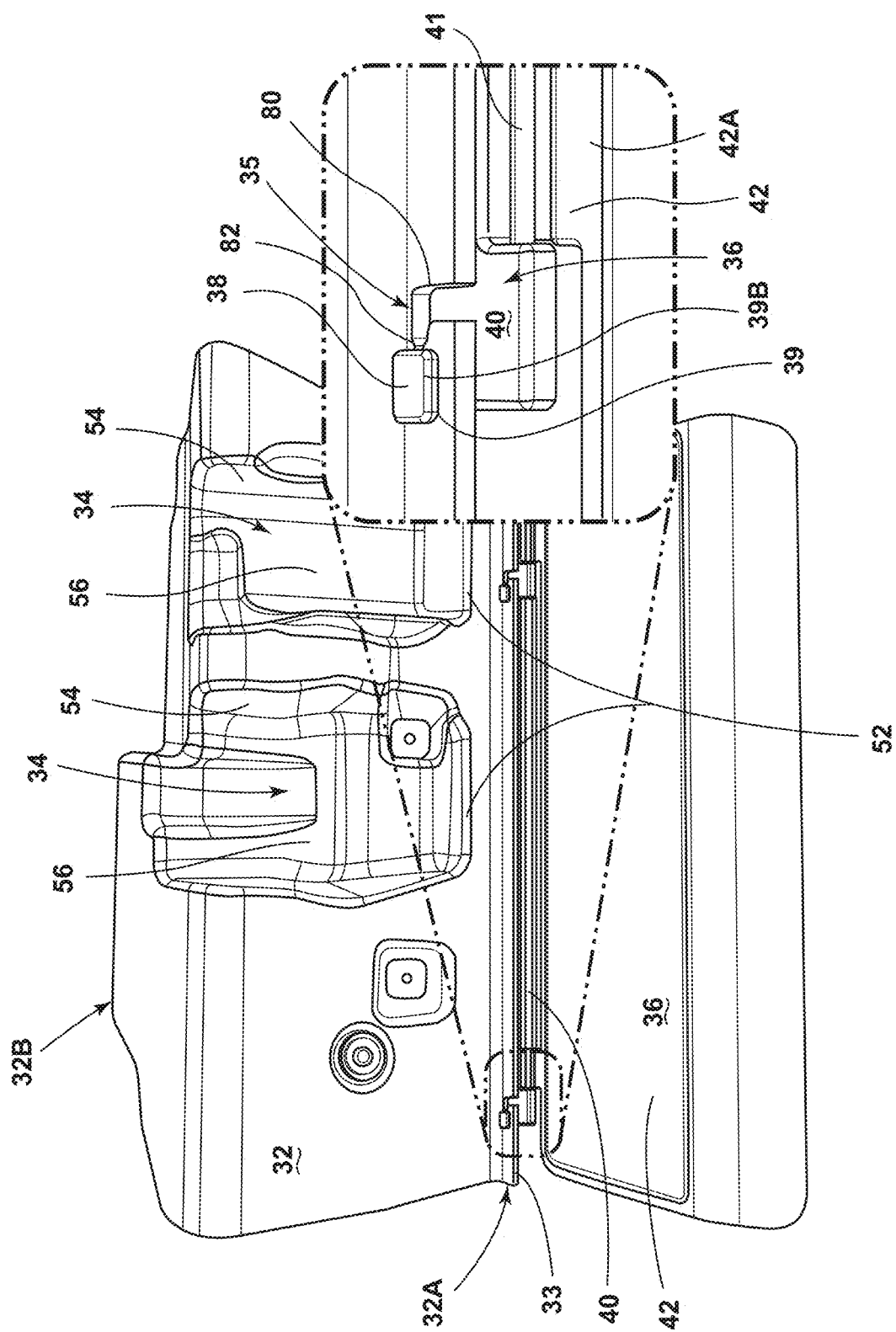
FIG. 4 is a frontal view of the footwell that includes an enlarged view of a portion of the footwell, illustrating a connecting member of the cover feature coupled to a receiving member via corresponding attachment features of the connecting member and the receiving member, according to one embodiment.

As shown in FIGS. 1-4, in various embodiments, the receiving member 32 may extend from a lower portion 32A of the receiving member 32 to an upper portion 32B of the receiving member 32. In various embodiments, the lower portion 32A may be generally proximate to the floor 21 of the footwell 20. In some embodiments, the lower portion 32A may be proximate to the shelf 19 of the floor 21 of the footwell 20. As depicted in FIGS. 1-4, in various embodiments, the receiving member 32 may extend generally vehicle-upward from the lower portion 32A to the upper portion 32B. In some embodiments, the upper portion 32B of the receiving member 32 may be vehicle-forward of the lower portion 32A of the receiving member 32. In some embodiments, the lower portion 32A may include a lip 33 that protrudes outward from the receiving member 32. As illustrated in FIGS. 4 and 5, the lip 33 may extend outward from the receiving member 32 generally in the vehicle-rearward direction, in some embodiments.

Referring now to FIGS. 4 and 5, in various embodiments, the receiving member 32 may include an attachment feature 35. The attachment feature 35 may be configured to engage with a corresponding attachment feature 38 of the cover feature 36, such that engagement of the attachment features 35, 38 couples the cover feature 36 to the receiving member 32, as will be described further in subsequent paragraphs. In various embodiments, the attachment feature 35 of the receiving member 32 may be disposed proximate to the lower portion 32A of the receiving member 32. In some embodiments, the attachment feature 35 may be disposed proximate to the lip 33 of the receiving member 32.

In various embodiments, the attachment feature 35 of the receiving member 32 may be a slot feature 80 defined by the receiving member 32. In some embodiments, the slot feature 80 may be defined by the lower portion 32A and/or the lip 33 of the receiving member 32. For example, as shown in FIGS. 4 and 5, the slot feature 80 may be a cutout in the lower portion 32A that extends from an outer periphery of the lip 33 and is defined by the lip 33. In some embodiments, the slot feature 80 may extend in varying directions throughout its length and/or may be shaped in such a way that corresponding attachment features 38 may be securely engaged with the slot feature 80 via strategic positioning of the attachment features 38 within the slot feature 80. For example, in the embodiments shown in FIGS. 7A-7C, the slot feature 80 defined by the lip 33 of the lower portion 32A of the receiving member 32 is a generally L-shaped cutout that is made narrower in one section by retention features 82 protruding into the cutout further than other portions of the surrounding lip 33. The slot feature 80 being shaped in this way allows the corresponding attachment feature 38 of the cover feature 36 to be moved into the opening of the slot feature 80, as shown in FIGS. 7A and 7B, and then over toward the end of the slot feature 80, as shown in FIG. 7C, wherein the retention features 82 may aid in retaining the attachment feature 38 of the cover feature 36 securely within the slot feature 80. It is contemplated that, in various embodiments, the attachment feature 35 of the receiving member 32 may be one or more of a variety of features configured to be attached to another corresponding attachment feature 38 (e.g., a snap-fit, a twist-lock, mating engagement features, magnetic couplers, engaging stems, etc.).

In reference to FIGS. 1-4, in various embodiments, the receiving member 32 may define the recess 34. The recess 34 may include an outer rim 52. One or more side walls 54 of the recess 34 may extend from the outer rim 52 to a base wall 56 of the recess 34. In some embodiments, the recess 34 may be disposed vehicle-upward of the lower portion 32A of the receiving member 32. The recess 34 may be configured to receive the at least one foot pedal 24. In various embodiments, the recess 34 may be configured to receive the at least one foot pedal 24 when the at least one foot pedal 24 moves from the use position to the stowed positon, such that the at least one foot pedal 24 is nested within the recess 34 of the receiving member 32. In various embodiments, at least a portion of the at least one foot pedal 24 may be received within the recess 34. In other words, in various embodiments, the recess 34 may partially, substantially, and/or majorly receive the at least one foot pedal 24. For example, as shown in FIGS. 3A and 3B, the recess 34 may receive the pad 24A of the brake pedal 28 entirely, while receiving only a portion of the lever feature 24B of the brake pedal 28. In some embodiments, the at least one foot pedal 24 may contact the receiving member 32 and/or the recess 34 while in the stowed position. It is contemplated that the receiving member 32 may include a plurality of recesses 34 and that the plurality of recesses 34 may be configured to receive a plurality of foot pedals 24. For example, as depicted in FIGS. 3A and 3B, the receiving member 32 may include two recesses 34 configured to respectively receive the brake pedal 28 and the accelerator pedal 26 while in the stowed positions. It is further contemplated that multiple foot pedals 24 may be received by a single recess 34, in some embodiments.

Figure 2A:
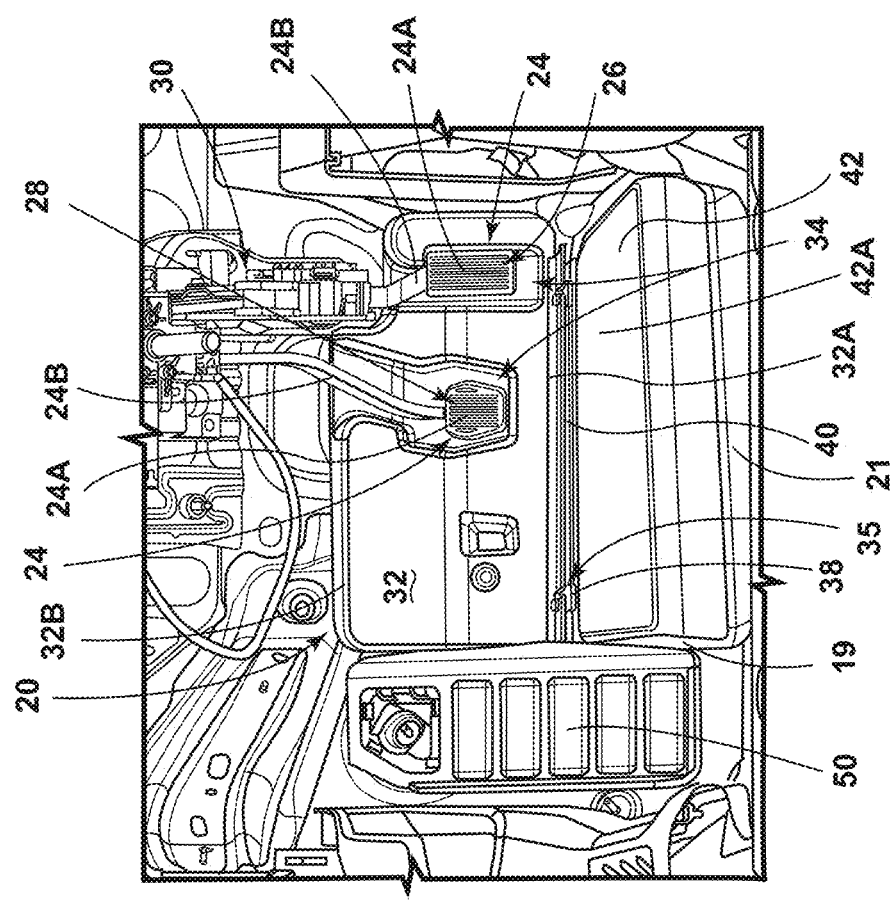
FIG. 2A is a perspective view of the footwell, illustrating the foot pedals in a use position and a cover feature in a first position, according to one embodiment.
Figure 2B:
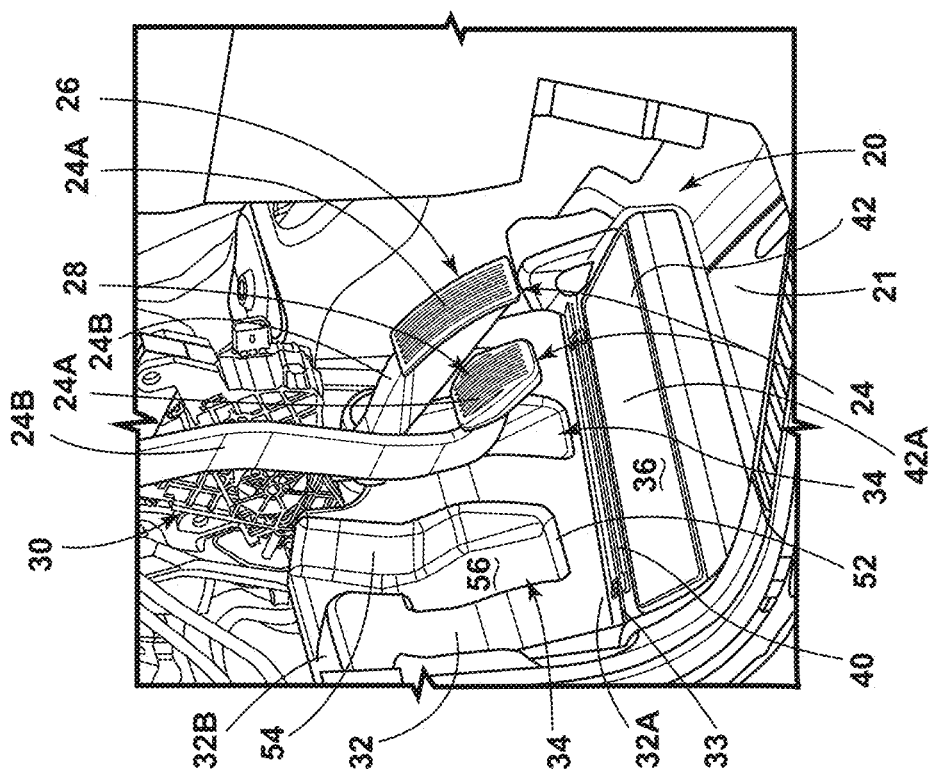
FIG. 2B is a frontal view of the footwell, illustrating the foot pedals in the use position and the cover feature in the first position, according to one embodiment.

As shown in FIGS. 2B and 3B, the receiving member 32 may be disposed laterally-vehicle-inboard of a dead pedal 50 disposed within the footwell 20. As depicted, the receiving member 32 may further be disposed vehicle-forward of the vehicle-rearward surface of the dead pedal 50. It is contemplated that the receiving member 32 may be formed of at least one of a variety of materials that includes, but is not limited to, foam, plastic, metal, rubber, natural materials, fibers, and/or a combination thereof.

In reference to FIGS. 4 and 6-8B, the cover feature 36 may be disposed within the footwell 20 and configured to cover the at least one foot pedal 24 when the at least one foot pedal 24 is in the stowed position. In various embodiments, the cover feature 36 may be coupled to the receiving member 32. In some embodiments, the cover feature 36 may be removably coupled to the receiving member 32. For example, in some embodiments, the cover feature 36 may be operable between an engaged condition, wherein the cover feature 36 is engaged with the receiving member 32, and a disengaged condition, wherein the cover feature 36 is disengaged from the receiving member 32. In some embodiments, the cover feature 36 may include the attachment feature 38 that corresponds with the attachment feature 35 of the receiving member 32. The corresponding attachment features 35, 38 may engage one another to couple the cover feature 36 with the receiving member 32, in some embodiments. For example, in some embodiments, the cover feature 36 may be in the engaged condition by virtue of the attachment feature 38 of the cover feature 36 being engaged with the attachment feature 35 of the receiving member 32 to couple to the cover feature 36 to the receiving member 32. As such, in some embodiments, the cover feature 36 may be in the disengaged condition on account of the attachment feature 38 of the cover feature 36 being disengaged from the attachment feature 35 of the receiving member 32.

In further reference to FIGS. 4 and 6-8B, in various embodiments, the cover feature 36 may include the connecting member 40 and the cover member 42. In some embodiments, the connecting member 40 may include the attachment feature 38 of the cover feature 36. For example, as shown in FIG. 6, in some embodiments, the attachment feature 38 may be a protrusion 39 extending outward from the connecting member 40 that is configured to be engaged with the slot feature 80 defined by the receiving member 32. The protrusion 39 may extend outward from the connecting member 40, such that the protrusion 39 extends generally vehicle-upward from the connecting member 40 and through the slot feature 80 when the cover feature 36 is in the engaged condition relative to the receiving member 32, in some embodiments. The protrusion 39 illustrated in FIG. 6 includes a shaft 39A and a head portion 39B that is coupled to the distal end of the shaft 39A relative to the connecting member 40. In such embodiments, the relatively thinner shaft 39A of the protrusion 39 may move into and out of the slot feature 80 of the receiving member 32, while the relatively thicker head portion 39B may aid in retaining the protrusion 39 within the slot feature 80, when the cover feature 36 is in the engaged condition, as shown in FIG. 4. In some embodiments, the movement of the protrusion 39 into and out of the slot feature 80 may be generally vehicle-lateral movement. It is contemplated that the cover feature 36 may include one or more of a variety of types of attachment features 38 configured to be engaged with the corresponding attachment feature 35 of the receiving member 32 (e.g., a snap-fit, a twist-lock, mating engagement features, magnetic couplers, engaging stems, etc.).

In some embodiments, at least a portion of the connecting member 40 may be disposed vehicle-downward of the receiving member 32 when the cover feature 36 is in the engaged condition. In some embodiments, at least a portion of the connecting member 40 may be disposed vehicle-downward of the lower portion 32A and/or the lip 33 of the receiving member 32 when the cover feature 36 is in the engaged condition. For example, as shown in FIG. 4, in some embodiments, the entire connecting member 40, except for the attachment feature 38, may be disposed vehicle-downward of the lower portion 32A and/or the lip 33 of the receiving member 32 when the cover feature 36 is in the engaged condition.

Referring still to FIGS. 4 and 6-8B, in various embodiments, the cover member 42 may be coupled to the connecting member 40. In various embodiments, the cover member 42 may be operably coupled to the connecting member 40, such that the cover member 42 may be operable to move relative to the connecting member 40 between various positions. In some embodiments, the cover member 42 may be pivotably coupled to the connecting member 40 and may be operable to pivot relative to the connecting member 40 about a pivot axis 41 between various rotational positions. The pivot axis 41, about which the cover member 42 is configured to pivot, may extend generally vehicle-laterally when the cover feature 36 is in the engaged condition relative to the receiving member 32, in some embodiments. In such embodiments, the cover member 42 of the cover feature 36 may be configured to pivot in a generally vehicle-forward direction about the pivot axis 41 that extends in a generally vehicle-lateral direction. In some embodiments, the pivot axis 41, about which the cover member 42 is configured to rotate, may be generally vehicle-rearward of the receiving member 32, when the cover feature 36 is in the engaged condition. In some embodiments, the pivot axis 41 may be generally vehicle-downward of the receiving member 32, when the cover feature 36 is in the engaged condition.

Referring now to FIGS. 8A and 8B, in various embodiments, the cover member 42 may include a first surface 42A and a second surface 42B. In some embodiments, the first surface 42A may be disposed on a side of the cover member 42 that is generally opposite of the side of the cover member 42 that the second surface 42B is disposed thereon. For example, the first surface 42A of the cover member 42 is shown in FIG. 8A, wherein the cover member 42 is in a first rotational position relative to the connecting member 40, while the second surface 42B of the cover member 42 is illustrated in FIG. 8B, wherein the cover member 42 is in a second rotational position relative to the connecting member 40 that is vehicle-forward of the rotational position depicted in FIG. 8A.

Referring now to FIGS. 8A and 8B, in various embodiments, the cover feature 36, while in the engagement condition, may be operable between a first position and a second concealment position, in which the cover feature 36 is configured to cover the at least one foot pedal 24, when the at least one foot pedal 24 is in the stowed position. In some embodiments, movement of the cover feature 36 from the first position to the second concealment position may include pivotal movement of at least a portion of the cover feature 36 in a generally vehicle-forward direction. For example, in some embodiments, the cover feature 36 moves from the first position, as shown in FIG. 8A, to the second concealment position, as shown in FIG. 8B, via rotational movement of the cover member 42 relative to the connecting member 40 about the pivot axis 41. As shown in FIG. 8A, the first surface 42A of the cover member 42 may be generally vehicle-upward of the second surface 42B of the cover member 42, (which is not shown, but is in contact with the floor 21 of the footwell 20) while the cover feature 36 is in the first position. In other words, in some embodiments, the second surface 42B of the cover member 42 may be generally vehicle-downward of the first surface 42A of the cover member 42 when the cover feature 36 is in the first position. As shown in FIG. 8B, in some embodiments, the first surface 42A of the cover member 42 may be generally vehicle-forward of the second surface 42B of the cover member 42 and the first surface 42A may be in contact with the receiving member 32, when the cover feature 36 is in the second concealment position.

Referring still to FIGS. 8A and 8B, in some embodiments, the cover feature 36 and/or the cover member 42 of the cover feature 36 may be configured to extend across at least a portion of the recess 34 of the receiving member 32, while the at least one foot pedal 24 is in the stowed position and the cover feature 36 is in the second concealment position. It is contemplated that, in some embodiments, the cover feature 36 may move between the first position and the second concealment position via actuation of an actuator. In various embodiments, the actuator may be a motor configured to move the cover feature 36. The movement may be automated in such a way that the controller 60 prompts the actuation in response to receiving inputs 68, such as a vehicle occupant command, or determination, that a predetermined condition has been met.

Figure 9:
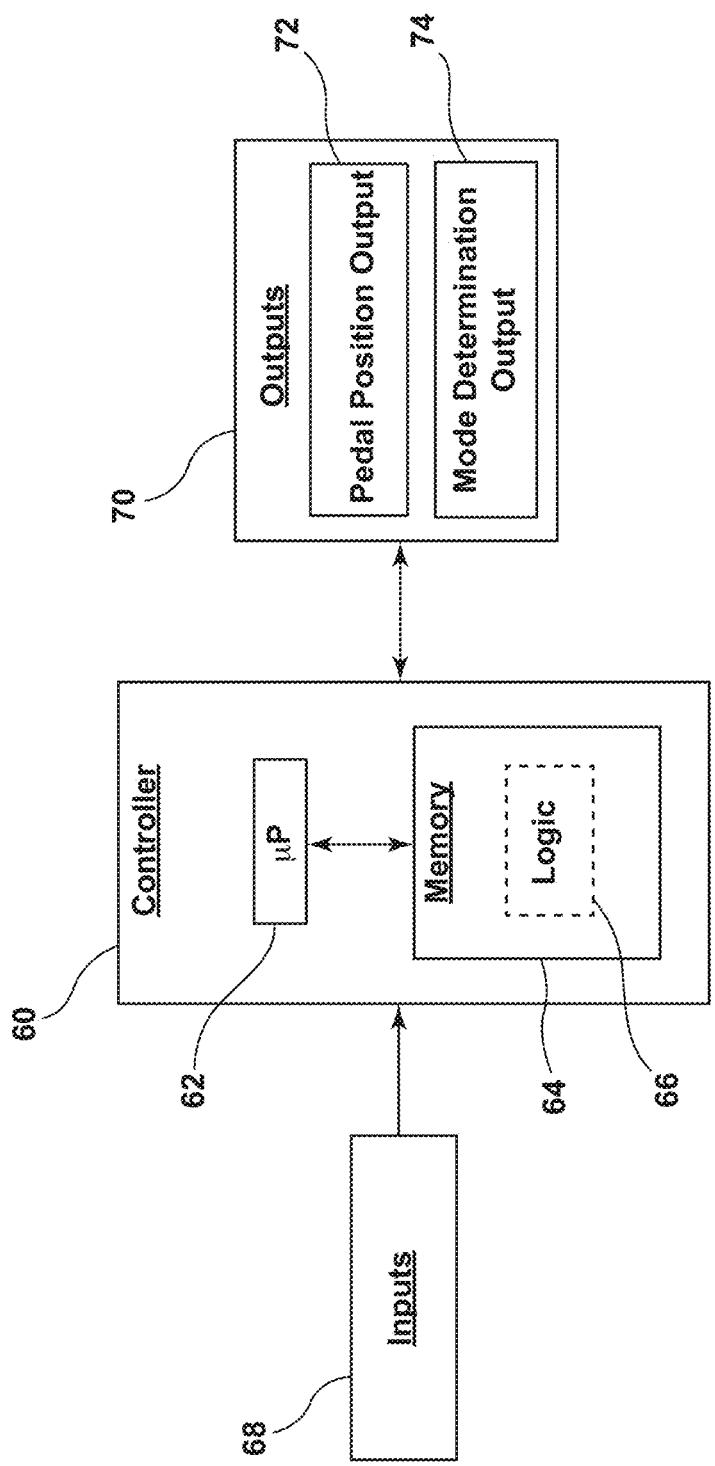
FIG. 9 is a block diagram of vehicle controls, illustrating a controller for controlling the foot pedals, according to one embodiment.

Referring now to FIG. 9, as referenced above, the vehicle 10 may include the controller 60 which may be configured to receive various inputs 68 and generate various output signals to control outputs 70 that may involve the at least one foot pedal 24 and/or other components of the vehicle 10. The controller 60 may be a shared or dedicated controller that includes a microprocessor 62 and memory 64, as illustrated in FIG. 9, according to various embodiments. It should be appreciated that the controller 60 may include control circuitry, such as analog and/or digital control circuitry. Stored within the memory 64 and executed by the microprocessor 62 is logic 66 for processing the various inputs 68 and controlling various outputs 70 described herein.

The inputs 68 to the controller 60 may include commands entered into the vehicle 10 by the vehicle occupant. For instance, the controller 60 may receive an input 68 in the form of a signal sent to the controller 60 in response to the vehicle occupant entering a command into a Human-Machine Interface (HMI) of the vehicle 10. In some embodiments, the controller 60 may receive inputs 68 from various data collecting sensors coupled to the vehicle 10. For instance, in some embodiments, the controller 60 may receive an input 68 in the form of a signal sent to the controller 60 by a sensor coupled to the vehicle 10 in response to the sensor sensing that a predetermined condition had been met.

In various embodiments, the controller 60 may control various outputs 70 in response to receiving inputs 68. In some embodiments, the controller 60 may respond to an input 68 by executing a pedal position output 72 that prompts the at least one foot pedal 24 to move from the use position to the stowed position or from the stowed position to the use position. For example, the controller 60 may respond to the vehicle occupant entering a command into the HMI of the vehicle 10 by controlling the pedal position output 72 that causes the actuator 30 to move the brake pedal 28 from the use position to the stowed position. In some embodiments, the controller 60 may respond to an input 68 by executing a mode determination output 74 that causes the at least one foot pedal 24 to switch between activated and deactivated modes. For example, the controller 60 may respond to a command to put the vehicle 10 into autonomous mode by controlling the mode determination output 74 that prompts the at least one foot pedal 24 to switch from the activated mode to the deactivated mode. It is contemplated that the controller 60 may receive inputs 68 and control outputs 70 that influence various other vehicle functions and, further, that the controller 60 may be in communication with one or more other vehicle controllers.

In operation, in some embodiments, the vehicle occupant may input a command to the controller 60 that prompts the controller 60 to deactivate the at least one foot pedal 24 and move the at least one foot pedal 24 from the use position to the stowed position. The actuator 30 may then move the at least one foot pedal 24 from the use position to the stowed position, such that the at least one foot pedal 24 is nested within the recess 34 within the receiving member 32 disposed at the vehicle-forward end of the footwell 20. The user may then move the cover feature 36 from the first position to the second concealment position to cover the stowed at least one foot pedal 24, such that the at least one foot pedal 24 is disposed between the receiving member 32 and the cover feature 36. The user may accomplish this, in some embodiments, by pivoting the cover member 42 relative to the connecting member 40 in the generally vehicle-forward direction from the first position to the second concealment position, such that the first surface 42A of the cover member 42 is in contact with the receiving member 32. Further, upon desiring to activate the at least one foot pedal 24, the user may move the cover feature 36 from the second concealment position to the first position, revealing the at least one foot pedal 24, and then input a command to the controller 60 to prompt the actuator 30 to move the at least one foot pedal 24 from the stowed position to the use position.

The present disclosure may provide a variety of advantages. First, moving the deactivated at least one foot pedal 24 from the use position to the stowed position may prevent the at least one foot pedal 24 from unnecessarily taking up space in the footwell 20. Second, the recess 34 defined by the receiving member 32 may provide an area for the at least one foot pedal 24 to be stowed while in the stowed position, such that the at least one foot pedal 24 is not inconveniently protruding into the footwell 20. Third, the cover feature 36 may give an aesthetically streamlined appearance to the footwell 20 when the at least one foot pedal 24 is in the stowed position and the cover feature 36 is in the second concealment position. Fourth, the cover feature 36 may reduce potential confusion for the vehicle occupant as to whether the at least one foot pedal 24 is in an activated mode or a deactivated mode when the at least one foot pedal 24 is in a deactivated mode and in the stowed position while the cover feature 36 is in the second concealment position covering the at least one foot pedal 24. Fifth, the cover feature 36 being removable from the receiving member 32 by moving the cover feature 36 from the engaged condition to the disengaged condition may allow the user to replace the cover feature 36 with relative ease.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A footwell assembly for a vehicle, comprising:
a receiving member that defines a recess configured to receive a stowed foot pedal within the footwell and includes a lip vehicle-downward of the recess that protrudes outward from the receiving member vehicle-rearward; and
a cover feature, comprising:
a connecting member removably coupled to the lip of the receiving member; and
a cover member coupled to the connecting member and operable to move relative to the connecting member from a first position to a second concealment position to cover the stowed foot pedal.

2. The footwell assembly of claim 1, wherein the receiving member extends generally vehicle-upward from a lower portion proximate to a floor of the footwell to an upper portion, wherein the lower portion includes the lip.

3. The footwell assembly of claim 2, wherein the receiving member comprises:
an attachment feature positioned at the lip and configured to be engaged with a portion of the cover feature.

4. The footwell assembly of claim 3, wherein the connecting member of the cover feature comprises:
an attachment feature configured to be engaged with the attachment feature of the receiving member.

5. The footwell assembly of claim 4, wherein the cover feature is operable between an engaged condition, wherein the attachment feature of the connecting member is engaged with the attachment feature of the receiving member, and a disengaged condition, wherein the attachment feature of the connecting member is disengaged from the attachment feature of the receiving member.

6. The footwell assembly of claim 5, wherein the attachment feature of the receiving member comprises:
a slot feature defined by the lip of the receiving member.

7. The footwell assembly of claim 6, wherein the attachment feature of the connecting member comprises:
a protrusion that extends outward from the connecting member, such that the protrusion extends generally vehicle-upward from the connecting member and through the slot feature defined by the lip of the receiving member when the cover feature is in the engaged condition.

8. The footwell assembly of claim 1, wherein the cover member of the cover feature is configured to move from the first position to the second concealment position by pivoting relative to the connecting member about a pivot axis.

9. The footwell assembly of claim 8, wherein the cover member comprises:
a first surface; and
a second surface disposed generally vehicle-downward of the first surface when the cover member is in the first position.

10. The footwell assembly of claim 9, wherein the first surface is configured to contact the receiving member when the cover member is in the second concealment position.

11. The footwell assembly of claim 10, wherein the second surface is configured to contact a floor of the footwell when the cover member is in the first position.

12. The footwell assembly of claim 8, wherein the pivot axis extends generally vehicle-laterally.

13. The footwell assembly of claim 12, wherein the pivot axis is disposed vehicle-downward of the lip of the receiving member.

14. A footwell assembly for a vehicle, comprising:
a foot pedal disposed in the footwell and movable between a use position and a stowed position;
a receiving member positioned within the footwell and defining a recess that the foot pedal is configured to nest within while in the stowed position, the receiving member having a lip positioned vehicle-downward of the recess; and
a cover feature operable between an engaged condition, wherein the cover feature is engaged with the lip of the receiving member, and a disengaged condition, wherein the cover feature is disengaged from the lip of the receiving member, the cover feature being operable, while in the engaged condition, between a first position and a second concealment position, wherein the cover feature is configured to cover the foot pedal when the foot pedal is in the stowed position.

15. The footwell assembly of claim 14, wherein movement of the cover feature from the first position to the second concealment position includes pivotal movement of at least a portion of the cover feature in a generally vehicle-forward direction about a pivot axis that extends in a generally vehicle-lateral direction.

16. The footwell assembly of claim 15, wherein the pivot axis is generally vehicle-rearward of the receiving member when the cover feature is in the engaged condition.

17. The footwell assembly of claim 15, wherein the pivot axis is generally vehicle-downward of the receiving member when the cover feature is in the engaged condition.

18. A footwell assembly for a vehicle, comprising:
a foot pedal disposed in the footwell and operable between a use position and a stowed position;
a receiving member positioned within the footwell and having a lower portion disposed proximate to a floor of the footwell, the receiving member defining a recess configured to receive the foot pedal when the foot pedal is in the stowed position and having an attachment feature disposed proximate to the lower portion; and
a cover feature, comprising:
a connecting member having an attachment feature configured to be engaged with the attachment feature of the receiving member, the connecting member being operable between an engaged condition, wherein the attachment feature of the connecting member is engaged with the attachment feature of the receiving member, and a disengaged condition, wherein the attachment feature of the connecting member is disengaged from the attachment feature of the receiving member, wherein the connecting member and the attachment feature of the connecting member move in unison between the engaged and disengaged conditions; and
a cover member pivotably coupled to the connecting member, such that when the connecting member is in the engaged condition, the cover member is operable to pivot relative to the connecting member between a first position and a second concealment position, wherein the cover member is configured to generally cover the foot pedal when the foot pedal is in the stowed position.

19. The footwell assembly of claim 18, wherein the cover member comprises:
a first surface; and
a second surface disposed generally vehicle-downward of the first surface when the cover member is in the first position.

20. The footwell assembly of claim 19, wherein the first surface is configured to contact the receiving member when the cover member is in the second concealment position, and the second surface is configured to contact the floor of the footwell when the cover member is in the first position.

\* \* \* \* \*